(12) United States Patent
Bliss et al.

(10) Patent No.: US 7,150,006 B2
(45) Date of Patent: Dec. 12, 2006

(54) TECHNIQUES FOR MANAGED CODE DEBUGGING

(75) Inventors: Andrew L. Bliss, Redmond, WA (US); Vance Palmer Morrison, Kirkland, WA (US); Sean Edwin Trowbridge, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 569 days.

(21) Appl. No.: 10/700,180

(22) Filed: Nov. 3, 2003

(65) Prior Publication Data

US 2005/0097399 A1 May 5, 2005

(51) Int. Cl.
*G06F 9/44* (2006.01)
*G06F 9/45* (2006.01)

(52) U.S. Cl. .................. 717/124; 717/140; 717/127
(58) Field of Classification Search .............. 717/124, 717/127, 140

See application file for complete search history.

(56) References Cited

U.S. PATENT DOCUMENTS

| | | | | |
|---|---|---|---|---|
| 5,410,648 A | * | 4/1995 | Pazel | 717/124 |
| 5,764,989 A | * | 6/1998 | Gustafsson et al. | 717/129 |
| 5,958,049 A | * | 9/1999 | Mealey et al. | 713/1 |
| RE36,422 E | * | 11/1999 | Pazel | 717/125 |
| 6,023,560 A | * | 2/2000 | Yoshida et al. | 358/1.16 |
| 6,043,897 A | * | 3/2000 | Morikawa et al. | 358/1.14 |
| 6,191,405 B1 | * | 2/2001 | Mishima et al. | 250/208.1 |
| 6,219,828 B1 | * | 4/2001 | Lee | 717/129 |
| 6,433,896 B1 | * | 8/2002 | Ueda et al. | 358/488 |
| 6,633,404 B1 | * | 10/2003 | Atsumi | 358/1.16 |
| 6,897,582 B1 | * | 5/2005 | Hoppe | 310/52 |
| 6,996,809 B1 | * | 2/2006 | Muhlestein et al. | 717/130 |
| 7,000,225 B1 | * | 2/2006 | Sangavarapu et al. | 717/129 |

OTHER PUBLICATIONS

JAVASCRIPT Handbook, Danny Goodman, Apr. 22, 1996, p. 368.*
How Debuggers Work Algorithms, Data Structures, and Architecture, Jonathan B. Rosenberg, 1996, Whole book.*
"Managed Code Application Development for Windows Embedded Platforms", Mar. 4, 2003, retrieved from http://msdn.microsoft.com/chats/embedded/embedded_020603.asp. pp. 1-8.
What is TestCanter? (1995), pp. 2-16.

* cited by examiner

*Primary Examiner*—Todd Ingberg
(74) *Attorney, Agent, or Firm*—Workman Nydegger

(57) ABSTRACT

A system and method for facilitating cross-process access into a managed code process is useful in an embodiment of the invention for debugging managed code without perturbing the process being accessed or requiring the code under test to be running during debugging. A compiler according to an embodiment of the invention is used to produce mirror code wherein in-process pointers have been replaced with cross-process pointers in order to mirror the address space of the process under test to the address space of the mirror code process. In a further embodiment, the mirror code process is modified not only to allow but also to optimize the cross-process access.

23 Claims, 12 Drawing Sheets

TECHNIQUES FOR MANAGED CODE DEBUGGING

FIELD OF THE INVENTION

This invention relates generally to software development and, more particularly, relates to a system and method for debugging managed code using an out-of-process debugger.

BACKGROUND

In the early years of computer science, computer code was developed to run directly on a target machines in "native" format. This format for code storage and distribution remains popular today. However, a relatively newer model for code execution manages the code rather than allowing direct execution. Typically such code is stored and transported in an "intermediate language" form that is not itself executable. This increases the ease with which the code can be distributed over network connections to various machines of different architectures to run on each, since the intermediate language code can be compiled into native code to suit each target machine just before or even during runtime. Thus, for example, a piece of intermediate language code may be distributed in the same form to both an X86 and an IA64 machine and can run on both machines once compiled.

The reason that the portable representation is called "intermediate language" is that it is still in fact a refinement of higher level code, even though it has not been compiled to native code yet. Generally, a developer or group of developers writes the source code for a program or executable. Once the source code has been completed, it is compiled into the intermediate representation. The intermediate code can then be distributed and further compiled as described above.

Typically, the compilation and execution of the IL code is controlled or managed on the target machine by a runtime environment, e.g. another module or entity other than the code itself or the operating system of the target machine. For this reason, this type of code is generally referred to as managed code, whereas code that runs directly in native format without management is generally referred to as unmanaged code. One example of managed code is code produced to operate with the Common Language Runtime (CLR) designed by Microsoft Corporation of Redmond, Wash. Examples of typically unmanaged code include VB6, native C++, etc.

Managed code may be, but need not always be, slower in execution, however there are a number of benefits other than ease of distribution to be gained with the use of managed code. For example, a runtime environment can provide memory management services such as garbage collection, and may also provide security functions, reflection, etc.

With respect to all types of code, managed and unmanaged alike, it is desirable that the code be as free of errors as possible to assure a high quality product for the end user. Typically this requires that the code be error tested, or "debugged," prior to distribution. Unfortunately, managed code has proven to be more difficult to test for errors or "bugs" than unmanaged code due to the fact that it runs within a runtime environment.

One current solution is to place a debugger module into the code itself so that the debugger runs when the code runs, both being run within the run-time environment (in-process). Information regarding the state of the code is gleaned by the debugger from the memory used by the code via a COM pipeline or otherwise. However, this solution is not entirely satisfactory for a number of reasons. First, by having another entity, the debugger, running with the code under test, the actual operation of the code under test may be perturbed so that the test does not accurately reflect realistic operating conditions for the code. Moreover, this type of architecture typically requires that the debugger be stopped whenever execution of the code is stopped. This is undesirable in that it may be useful to check the state of the code while it is halted, or to check the state of the code based on a dump file after a crash.

BRIEF SUMMARY OF THE INVENTION

Embodiments of the invention provide a novel system and method for facilitating cross-process access into a managed code process. In an embodiment of the invention, the cross-process access is useful for debugging managed code without perturbing the process being accessed (hereinafter sometimes referred to as the "process under test" which corresponds to the code under test being run by the normal runtime process) and without requiring the code under test to be running during debugging.

In an embodiment of the invention, the compilation process is used to produce an alternative body of runtime code referred to herein as mirror code. The compiler replaces in-process pointers in the source code of the runtime with cross-process pointers in the mirror code such that the address space used by the runtime of the process under test can be accessed by the mirror code process and replicated in the address space used by the mirror code (modified runtime) process. In a further embodiment of the invention, the mirror code process is modified to optimize the cross-process access.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

The invention pertains to the testing of managed code for bugs (e.g. defects), and encompasses, in embodiments of the invention, a novel system and architecture that allows for the debugging of managed code by a debugger running out-of-process, i.e. not under the management of the run-time environment that is managing the code under test. It will be appreciated that while the examples herein focus on the task of debugging, and the applicability of the invention thereto in embodiments, the invention is also applicable in embodiments to other tasks where cross-process communications and remote replication of process data are needed.

The invention operates in a computer environment, and in particular operates on one or more computing devices in embodiments of the invention. Although there are many such devices suitable for implementing the invention, several exemplary types of computing devices are discussed below with respect to FIG. 1. It will be appreciated that this explanation is given for ease of understanding and is not intended to limit the scope of the invention.

Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Figure 1:
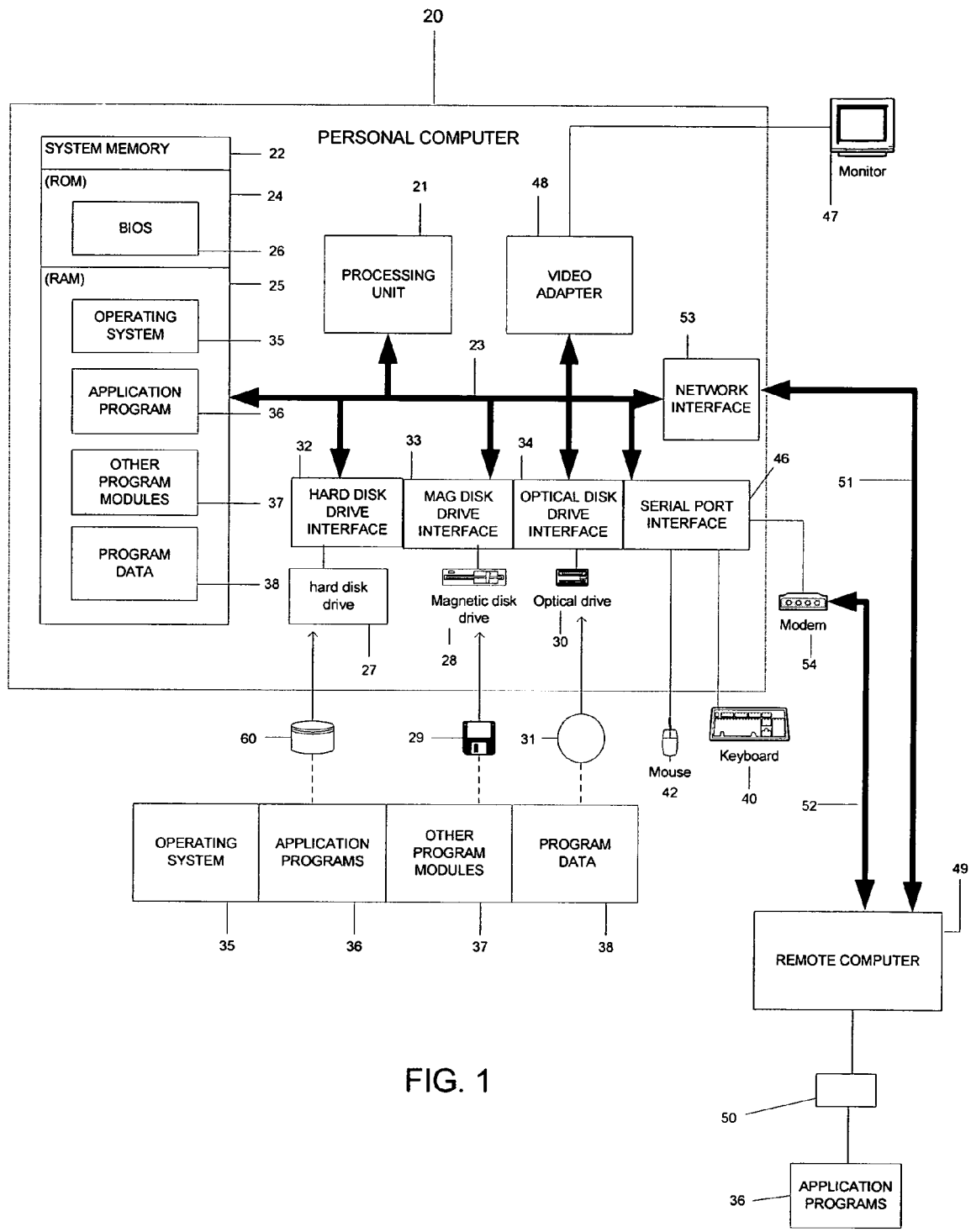
FIG. 1 is a block diagram generally illustrating an exemplary device architecture in which embodiments of the present invention may be implemented.

Turning now to FIG. 1, a general purpose computing device is shown in the form of a conventional computer 20, including a processing unit 21, a system memory 22, and a system bus 23 that couples various system components including the system memory to the processing unit 21. The system bus 23 comprises one or more physical busses of any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. In an embodiment of the invention, the hard disk 60 comprises multiple bootable partitions, each of which contains a bootable system, and each bootable system may comprise an operating system and other elements as described above.

A user may enter commands and information into the computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, computers may include other peripheral output devices, not shown, such as speakers and printers.

The computer 20 may operate in a networked environment using logical connections to one or more remote computers, such as a remote computer 49. The remote computer 49 may be a domain controller, server, router, network PC, personal computer, peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet. It will be appreciated that foregoing are exemplary and that other types of networks such as wireless or partly wireless networks, MANs, etc. may also be used by or accessible to the computer 20.

When used in a LAN networking environment, the computer 20 is connected to the local network 51 through a network interface or adapter 53. When used in a WAN networking environment, the computer 20 typically includes a modem 54 or other means for establishing communications over the WAN 52. The modem 54, which may be internal or external, is typically connected to the system bus 23 via the serial port interface 46. Program modules depicted relative to the computer 20, or portions thereof, may be stored in the remote memory storage device if such is present. It will be appreciated that the network connections shown are exemplary and other means of establishing a communications link between the computers may be used.

Herein, the invention will generally be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware. In the following discussion, computing devices may be of the architecture described above with respect to FIG. 1 regarding computer 20 and/or remote computer 49, or may alternatively have any other type of architecture.

Figure 2A:
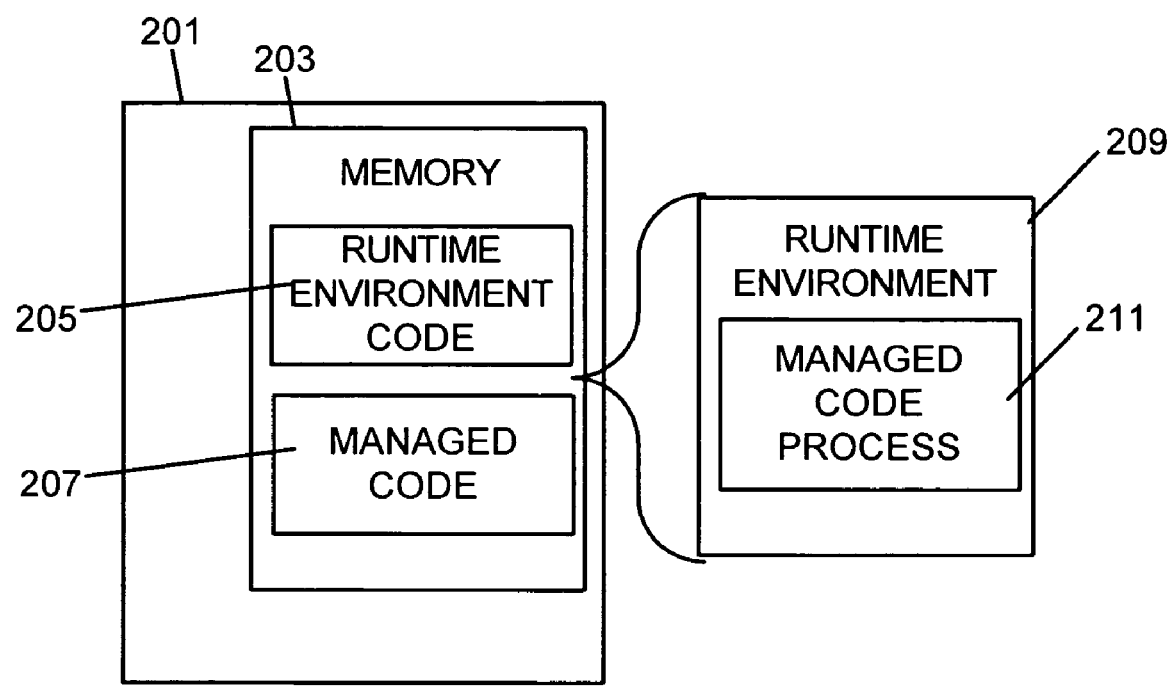
FIG. 2A is a schematic diagram of a prior art architecture for running managed code, including a representation of the relationship between the managed code and its runtime environment.

FIG. 2A illustrates in schematic form a typical architecture for the running of managed code. In particular, a computing device 201 such as described above with respect to FIG. 1 or otherwise, has a memory portion 203, which is illustrated as containing a run-time environment or virtual machine 205. In addition, the memory 203 contains managed code 207. It will be appreciated that any or all such components may be retrieved instead from any other type of storage or transmission medium. When the runtime environment 205 is running and is managing the execution of the managed code 207, the relationship between the environment and the code process is as shown by process 209, corresponding to the runtime environment code 205, and process 211, corresponding to the managed code 207. In particular, the execution of the managed code process 211 is controlled and managed by the runtime environment process 209.

In order to have the managed code 207 execute, the runtime environment process 209 typically compiles the code 207 from the intermediate format to a native format suitable for the target machine 201. The managed code 207 may be obtained from memory, as shown, or may instead be obtained from an alternative internal source or from an external source, such as via a network connection. An exemplary, but not exhaustive, selection of such network connections is discussed with reference to FIG. 1. Compilation of the managed code 207 to a native format may occur one time for the whole body of code 207 prior to execution, or may instead occur on a piecemeal basis during execution. The latter technique is sometimes preferred as it allows for earlier commencement of execution, and, in addition depending upon the implementation, assures that only code that is actually needed is compiled to native code. This tends to preserve valuable computational resources for allocation to other tasks. The compilation process, whether carried out at once or spread over time as needed, may include various other activities, including checking for malicious code, checking for dysfunctional code, and optimization with respect to memory usage, instruction execution order, references, and so on.

If the code 207 does contain an error, it may or may not be executable, and if the code 207 is still executable it may yet execute in an erroneous manner. For this reason, it is typically necessary to error check, or debug, the code 207 prior to distribution by the producer thereof. With respect to unmanaged code, it is not challenging to check the state of the code, e.g. the state of the registers used by the code, during testing in order to verify proper operation. However, this is more difficult with respect to managed code. As discussed above, although solutions have been implemented, these solutions leave much to be desired. In particular, these solutions do not provide an out-of-process debugger that leaves the code under test unperturbed and that has the ability to check the state of the code even when the code has stopped running.

Figure 2B:
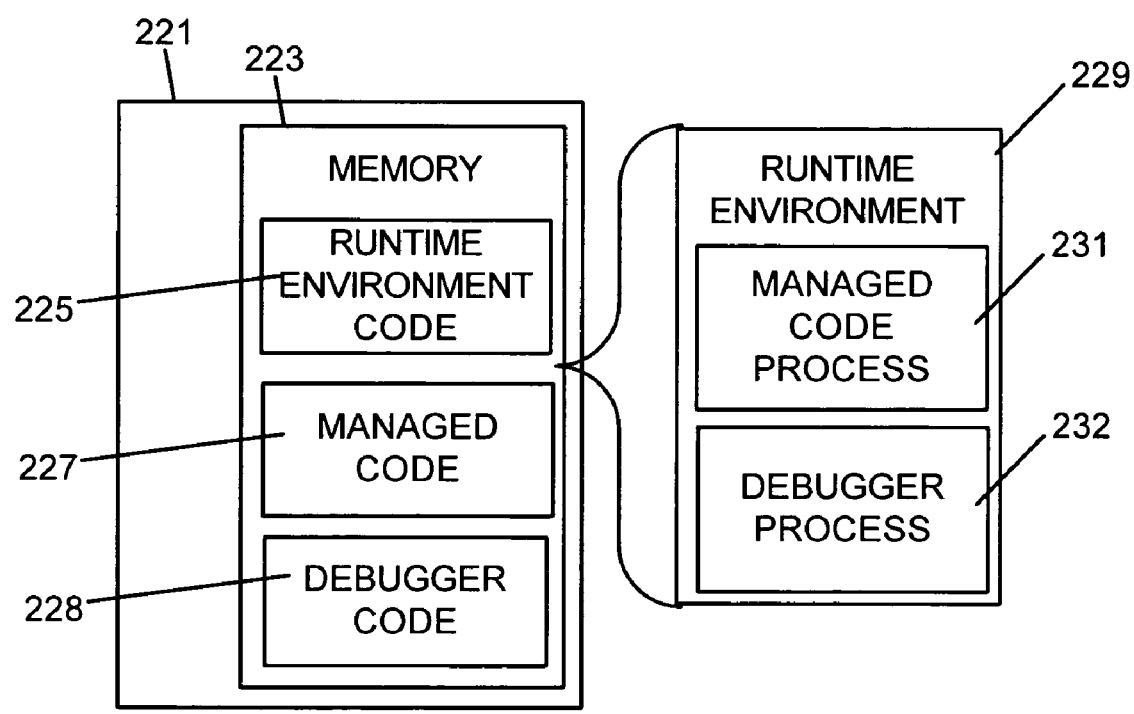
FIG. 2B is a schematic diagram of a prior art architecture for debugging managed code using an in-process debugger.

One such prior architecture is shown in FIG. 2B for ease of understanding. As with the architecture shown in FIG. 2A, the memory 223 of the architecture 221 contains managed code 227 and runtime environment code 225. However, the memory 223 also includes debugger code 228 to be run with the managed code 227 or as part of the code 227. During testing, when the runtime environment 229, the managed code process 231, and the debugger process 232 are running, the relationship between the processes is as shown schematically by process 229 representing the runtime environment 225, process 231 representing the managed code 227, and process 232 representing the in-process debugger. Although the debugger process 232, running in process, is able to access the state of the managed code process 231, it may also perturb the operation of the managed code process 231, and may also be unable to run and access the state of the code process 231 unless the code process 231 itself running. For these and other reasons, the illustrated architecture does not allow complete and accurate testing and debugging of managed code.

Figure 3:
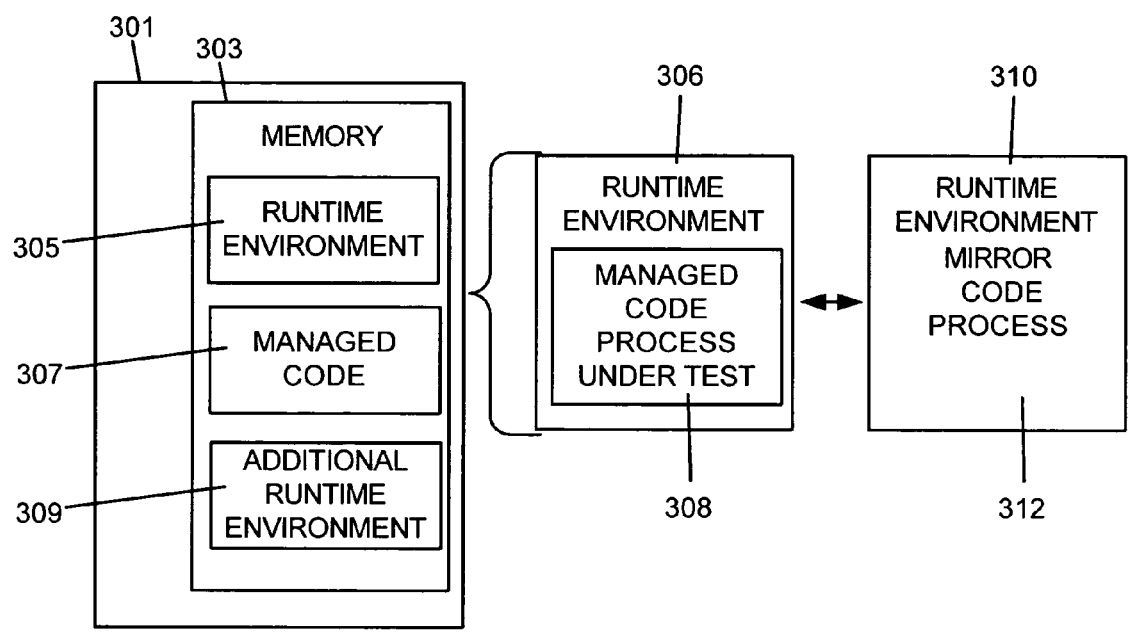
FIG. 3 is a schematic diagram of an architecture according to an embodiment of the invention for debugging managed code using an out-of-process debugger.

An exemplary debugging architecture according to an embodiment of the invention is illustrated schematically in FIG. 3. In particular, the illustrated embodiment of the invention allows cross-process debugging of managed code as will explained in greater detail hereinafter. Although the elements of the illustrated embodiment will be shown with respect to a single machine, it will be appreciated that the cross-process nature of the system allows communication between processes that reside either on the same or different machines.

In the example embodiment of the invention illustrated in FIG. 3, a computer or computing device 301 comprises a memory 303 or other data source(s), within which reside runtime environment code 305 and a body of managed code 307 to be tested. In addition, the memory 303 may also comprise additional runtime environment code 309, which may be different from the runtime environment code 305. The way in which the mirror code 311 is used to test the managed code to be tested will be described in greater detail hereinafter.

When the runtime environment code 305, the modified runtime code 309, and the body of managed code 307 to be tested are running, exemplary relationships are as shown in FIG. 3. In particular, the runtime environment 305, represented by the process 306, manages the process of the code to be tested 307, represented by process 308. In brief overview, the mirror code process 310 retrieves information regarding the state of the process 306 and hence the process 308 of the code under test, without perturbing the operation of either process 306, 308, and uses the retrieved information for example to evaluate the operation of the process 308. In this manner, the integrity of the code 307 under test can itself be evaluated.

Figure 4:
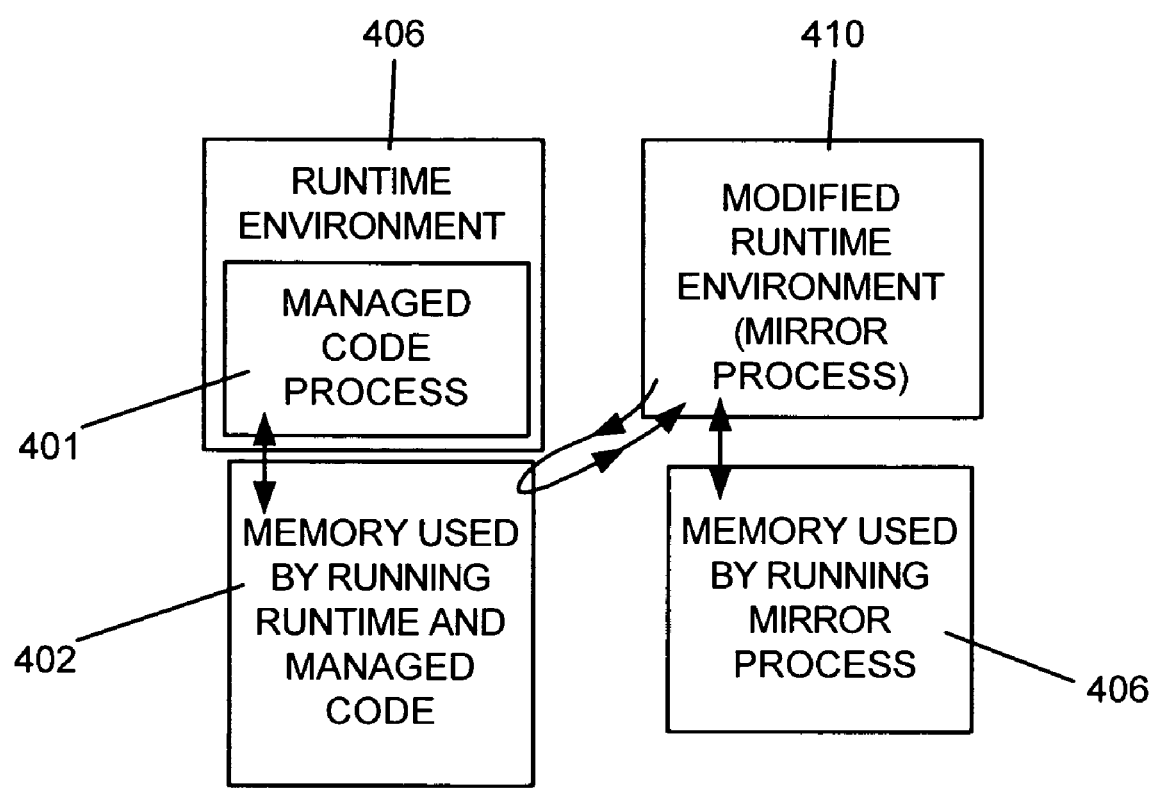
FIG. 4 is a schematic diagram showing the access and relationships between an out-of-process mirror code process and a process according to a body of code under test for debugging the code under test.

The schematic illustration of FIG. 4 shows the interaction between the code process under test and the mirror code (modified runtime) process in greater detail. In particular, the code process under test 401 runs as it normally would in its normal environment, the runtime environment 403, without perturbation. As it runs, the code process under test 401 uses memory 402 to store information such as operands and results, pointers, tables, etc. Note that the reading and writing of memory 402 may actually be accomplished by the runtime environment 406 as it manages the process 401. At the same time, the mirror code process 410 also runs. The mirror code process 410 runs from a specially compiled version of the normal runtime environment source code, with certain changes that occurred during compilation to make it different in some respects from the normal runtime environment used to manage the process 401 of the code under test. These differences and their effects will be discussed in detail below, but in overview the mirror code process 410 is operative to obtain data, pointers, etc. cross-process from the memory 402 used by the code process under test 401 rather than from its own memory space 406. Note that although the cross-process access of the mirror code process 410 to the memory 402 will typically be read only, the mirror code process 410 and the code process under test 401 will both typically be able to read from and write to their own respective memory spaces.

The mirror code process 410 obtains and mirrors the data structures produced by the code process under test 401 or by the runtime environment 406 while managing the process 401. Thus, the operation of the code process under test 401 is not perturbed, but the data obtained by the mirror code process 410, such as in its memory space 406, can be used to analyze the operation of the code process under test 401, and thus the integrity of the corresponding code. The manner in which the mirror code memory contents 406 are used to debug the code under test or to verify proper operation thereof is not limited. However it is typically desirable to analyze the data structures in the mirror code memory contents 406 for errors or defects, or other indicia of erroneous or unintended operation, i.e. bugs. Once such occurrences are identified, the corresponding code under test can be modified, typically in source code form, and recompiled to IL code for retesting or distribution.

As described above, a single runtime code base, or body of source code, can be used both for managing the execution of managed code as well as for out-of-process debugging of that code. The technique that allows this dual use of source code involves dual compilation of the runtime source code, one compilation normal, and the other designed to produce the mirror code that uses cross-process access to mirror the data structures produced by the code process under test. In addition, the code is changed in an embodiment of the invention from the runtime code used to manage the code process under test to account for the fact that the mirror code process is operating in a cross-process rather than in-process manner. Each of these types of changes will be discussed below.

The compilation used to create the mirror code will be discussed with reference to the flow chart of FIG. 5 after a discussion of certain issues addressed by the compilation process. The aspects of the code that will be most affected in compiling the code for cross-process use are pointer references and known addresses such as global variables or code addresses. For the in-process code, i.e. the code under test, pointers and other references will work within the process in the proper manner after normal compilation. However, for the out-of-process code, i.e. the mirror code, such pointers and other references will need to refer to the data structures produced by the code under test rather than data structures produced by the mirror code.

For this reason, the compilation process for producing the mirror code replaces pointers with a template that will retrieve the required information out-of-process. Thus, the pointers are replaced by smart pointers as needed that embody both the original pointer as well as the functionality to use the original pointer for cross-process retrieval. Since the exchange of pointers for smart pointers is made during compilation of the mirror code, the developer of the runtime source code does not have to take any special precautions or actions in this regard.

Specific macros usable within an embodiment of the invention include a PTR_TO_TADDR (ptr) function for retrieving a raw test code address for a pointer, a PTR_HOST TO TADDR (host) function for returning an original test code address corresponding to a mirror process address of an instance produced by a pointer reference, a VPTR_HOST_VTABLE_TO ADDR (host) for returning a test code vtable pointer given a mirror process vtable pointer for a known VPTR class, a PTR_HOST_MEMBER_TADDR (type, host, memb) for retrieving the test code address of a mirror process instance pointer and offsetting it by the given member's offset within the type, a PTR_READ (addr, size) function for reading a block of memory from the test code process and returning a mirror process pointer for it (such as when reading blocks of data from the test code process whose size is only known at runtime, such as raw code for a method compiled on a "just in time" (JIT) basis.

The following is an example of replacement of an ordinary reference with a smart pointer.

Code as written:

```
BOOL IsTarget(LPVOID ip)
{
    StubCallInstrs* pStubCallInstrs = GetStubCallInstrs( );
    if (ip = = (LPVOID) &(pStubCallInstrs->m__op))
    {
        return TRUE;
    }
}
```

Modified Code:

```
BOOL IsTarget(LPVOID ip)
{
    StubCallInstrs* pStubCallInstrs = GetStubCallInstrs( );
    if ((TADDR)ip = = PTR__HOST__TO__TADDR(pStubCallInstrs) +
        (TADDR)offsetof(StubCallInstrs, m__op))
    {
        return TRUE;
    }
}
```

The parameter "ip" is a target address, i.e. an address in the memory space used by the process of the normal runtime and the managed code under test, so the host pStubCallInstrs cannot be used to derive an address from it. Thus, as shown above, the member and reference is preferably replaced with a conversion from host to target address followed by explicit offsetting for the field. A convenience macro such as PTR_HOST_MEMBER_TADDR may be used to encapsulate these two operations, so that the above code could also be modified as:

if ((TADDR)ip==
PTR_HOST_MEMBER_TADDR(StubCallInstrs, pStubCallInstrs, m_op)).

As another example, consider the following;

```
Previous Code:
    return (ArrayClass *) m_pMethTab->GetClass( );
Modified Code:
    return PTR_ArrayClass(m_pMethTab->GetClass( ));
```

Such pointer templates have an implicit conversion from a host pointer to a target address, so the cast above constructs a new PTR_ArrayClass by implicitly converting the host pointer result from GetClass( ) to its target address and using that as the address of the new PTR_ArrayClass. The actual host-side pointer values may not be the same. Host pointer identity can be assumed as long as the type of access is the same. In the example above, if both accesses were of type Class then the host pointer will be the same, so it is safe to retrieve the target address of an instance and then later get a new host pointer for the target address using the same type as the host pointer in that case will be the same. This behavior may be enabled by caching all of the retrieved host instances. This cache is searched by the addr:size pair and when there is a match the existing instance is reused. This increases performance and also allows simple pointer identity to hold. It does imply that host memory grows in proportion to the amount of target memory being referenced, so that retrieving extraneous data should be avoided when possible. The mirror process data cache grows until a flush method is called, at which point all mirror process data is discarded. Preferably, no mirror process instance pointers are held across a flush.

Another example is as follows:

Code as written:

```
static RangeSection* m_RangeTree;
RangeSection* ExecutionManager::m_RangeTree;
extern ThreadStore* g_pThreadStore;
ThreadStore* g_pThreadStore = &StaticStore;
```

Modified Code:

```
SPTR_DECL(RangeSection, m_RangeTree);
SPTR_IMPL(RangeSection, ExecutionManager, m_RangeTree);
GPTR_DECL(ThreadStore, g_pThreadStore);
GPTR_IMPL_INIT(ThreadStore, g_pThreadStore, &StaticStore);
```

When declaring the variable, the first argument declares the variable's type and the second argument declares the variable's name. When defining the variable the arguments are similar, with an extra class name parameter for the static class variable case.

While the aforementioned smart pointer replacement technique functions to allow for the cross-process retrieval of ordinary data, it is preferably refined in an embodiment of the invention so that virtual classes can also be mirrored cross-process by the mirror code. It is preferred that the source code for the code under test be type safe, without casting of pointers that may create problems in the mirror code process with respect to address offsets and pointer arithmetic.

Even so, there are instances when the size of a data structure to be retrieved cannot be ascertained immediately. For example, C++ classes make use of virtual methods. Additionally, object polymorphism often leads to uncertainty regarding the size and methods of an object implementing a class, making proper retrieval difficult. In an embodiment of the invention, to aid in replication of such classes by the mirror code, the compiler inserts into the compiled mirror code a process that will analyze the data produced by the code process under test to identify a pointer in an object that points to a table of routines for that object. Such a table is commonly referred to as a "vtable," and the associated pointer is often referred to as a "vtable pointer." In this manner, the overall size of the object can be ascertained and the necessary routines marshaled.

Certain other data types and references are also preferably accounted for. For example, software developers frequently use global data addresses. Global data addresses include, for example, references to global variables and code addresses. Since the debugger process, i.e. the mirror code process, typically will not have access to the actual global information, such references are preferably changed in the mirror code to be replaced by a proxy that embodies an indication of where the global information is in the process of interest, i.e. the code process under test corresponding to the code under test. To perform the proxy replacement, it is desirable that the developer of the code under test has listed the required globals in the source code, as is standard practice.

The compiler process for producing the mirror code scans the listing of globals and uses symbolic information to determine each global address, then encodes each such address in the mirror code proxy as data. The symbolic information contains for example name, type and address information, along with any other information desired. In embodiment of the invention, the symbols for the real in-proc runtime image file are used to determine the location of important global variables. The variables are looked up by name from the symbols and the address information is retrieved.

In addition, the proxy includes the functionality as discussed above for retrieving the referenced material cross-process rather than in-process. In an embodiment of the invention, the mirror code process first retrieves the information at the global addresses in the process of the code under test and then uses that information to retrieve other information from the process of the code under test, which itself may lead to yet further information in the process of the code under test, etc.

Another complexity in compiling the source code to produce the mirror code arises due to the fact that the inventive system may also be used between different machines rather than simply inter-process on the same machine. In a further embodiment of the invention, the compilation process for the mirror code accounts for the possibility that the different machines are actually different type platforms, e.g. platforms based on different types of CPU. For example, the code under test may be run on an x86 machine during the test while the debugger (the mirror code process) is run remotely on an IA64 machine. In this case, although the mirror code process is running on an IA64 machine, it is preferably able to use pointers of a different size, i.e. the pointers used in the x86 system. For example, IA64 uses 64-bit pointers, whereas the x86 system does not. In addition, padding may be different between the systems, and it should be ensured that types and alignment are proper. For example, the x86 system employs natural rather than forced alignment.

To account for these difficulties, when the mirror code is being compiled to run on a particular platform (i.e. when the source code for the normal runtime is being recompiled), the compiler preferably is aware of the differing platform on which the code under test will be run, and changes any entity in the source code that has a platform-dependent size to be consistent with the relevant size on the platform of the code under test rather than the platform used for the mirror code. Thus, in the example above, the IL code for the IA64 mirror code will be constructed so that it generates virtual x86 memory contents, i.e. an IA64 compatible representation of the x86 in-memory structures.

An example resolution of the foregoing is the treatment of vtables when differing computing device platforms are used for the code under test and the mirror code. Since vtable pointers will differ in size depending upon the platform used, offsets within classes may change. In an embodiment of the invention wherein the mirror code platform uses shorter pointers and the code under test platform uses longer pointers, i.e. 64-bit pointers, padding is added in the mirror code to allow for the storage of the longer vtable pointers.

In addition to the changes to the runtime code during compilation, discussed above, to produce the mirror code, the exemplary system comprises other alterations as well in an embodiment of the invention to optimize the cross-process access of the mirror code process to the process of the code under test. In particular, pointer references in code are common, and as discussed above all or most such references in the mirror code will point cross-process rather than in-process, increasing the overhead needed and decreasing the performance attainable. To ameliorate this difficulty, the mirror code process is preferably modified from the normal runtime to optimize the cross-process accesses.

In an embodiment of the invention, a caching technique is used that eliminates the need for some redundant cross-process retrievals and that also allows easy identification of cached material. The cache according to this embodiment of the invention preferably does not have automatic discarding behavior, in order to avoid dead pointers, although such behavior may be used depending upon designer preference. However, explicit cache management using garbage collection techniques or otherwise is preferably used in a further embodiment of the invention.

In addition, it is sometimes necessary to be able to map a mirror code pointer to a pointer in the process of the code under test when pointer values are important, such as when performing pointer arithmetic and pointer comparison. To this end, two cache mapping techniques will be discussed hereinafter, with the understanding that other mapping techniques may instead be used.

Figure 6A:
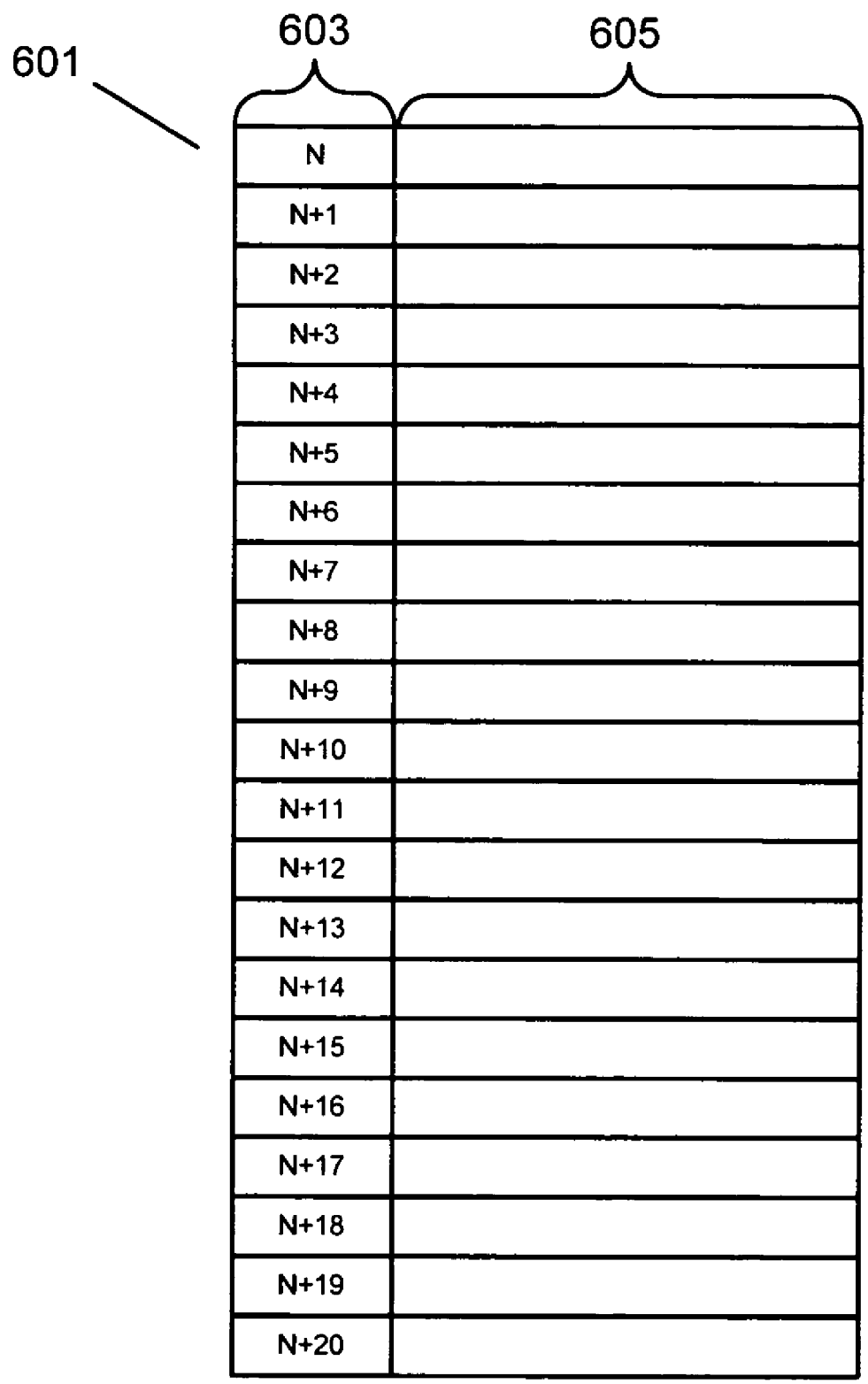
FIG. 6A is a diagrammatic representation of an address space to be mirrored.
Figure 6B:
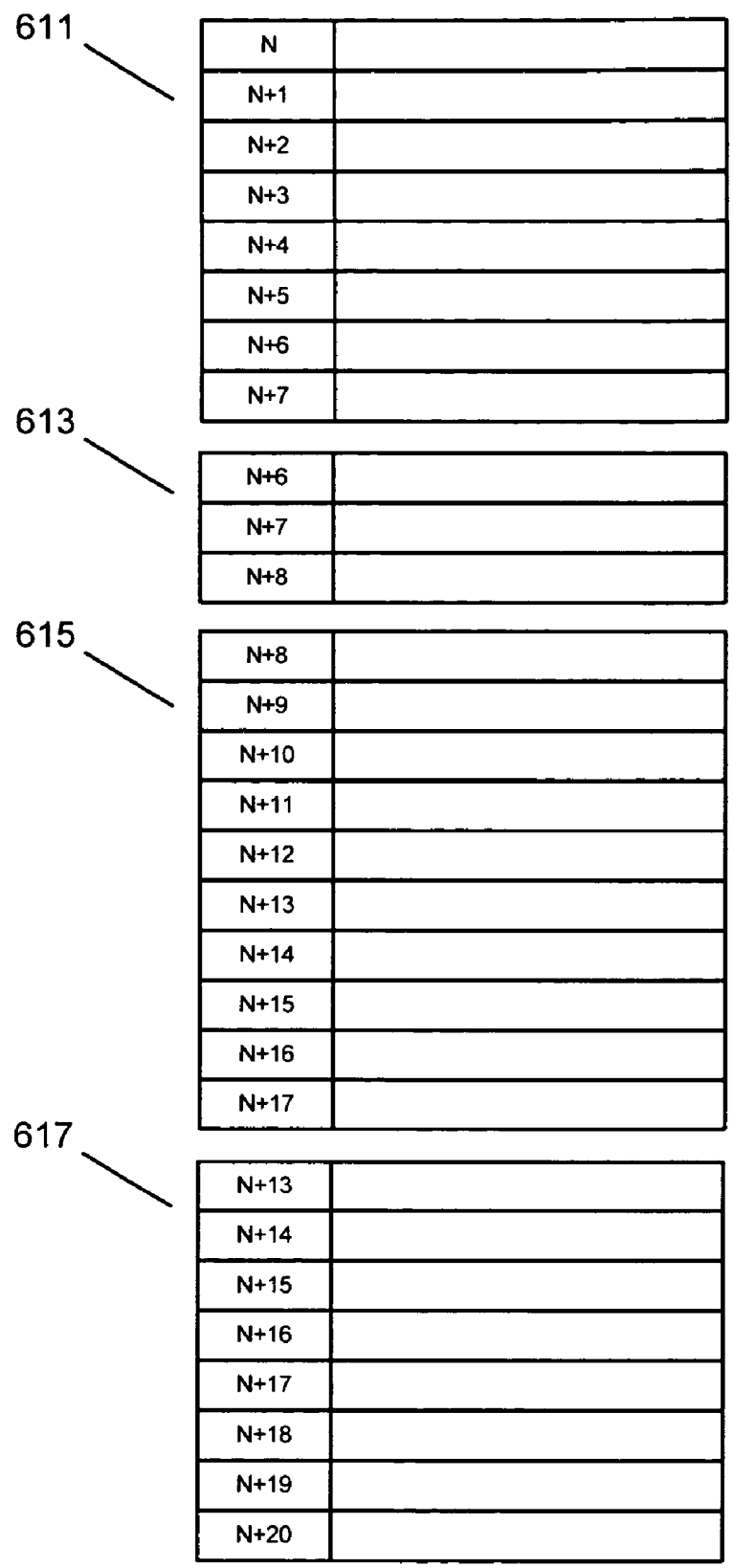
FIG. 6B is a diagrammatic representation of an address space that is mirrored using a caching technique according to an embodiment of the invention.

One exemplary technique will be discussed with reference to FIGS. 6A and 6B. In overview, the caching mechanism illustrated with reference to FIGS. 6A and 6B stores data to be retrieved in a hash table indexed by the starting address, in the process of the code under test, of the referenced material. An example memory structure 601 of the process of the code under test is shown, with address field 603 and content field 605. Twenty-one addresses are illustrated (N through N+20). Caching of this memory in the process of the mirror code is shown schematically in FIG. 6B. In particular, the memory blocks N through N+7 (611), N+6 through N+8 (613), N+8 through N+17 (615), and N+13 through N+20 (617) are stored. It will be appreciated that although this system allows rapid look-up and retrieval, there is some increased resource usage due to the fact that redundant information may be retrieved and stored when address blocks overlap. Thus, in the illustrated example, the material at each of addresses N+6, N+7, N+8, and N+13 through N+17 is stored twice in the cache for the mirror code process.

An alternative cache structure is illustrated by reference to FIGS. 7A–D, based on the address block example shown in FIG. 6A. In particular, instead of storing redundant information where referenced address blocks overlap, the cache for the mirror code process is maintained as a single entity that may be grown and coalesced over time as more retrievals are made. Thus, data corresponding to a particular address range may actually begin in the middle of a previously stored address range, and thus retrieval is only needed for the portions of the range not already represented. The progression of the cache is shown in FIGS. 7A–D.

Figure 7A:
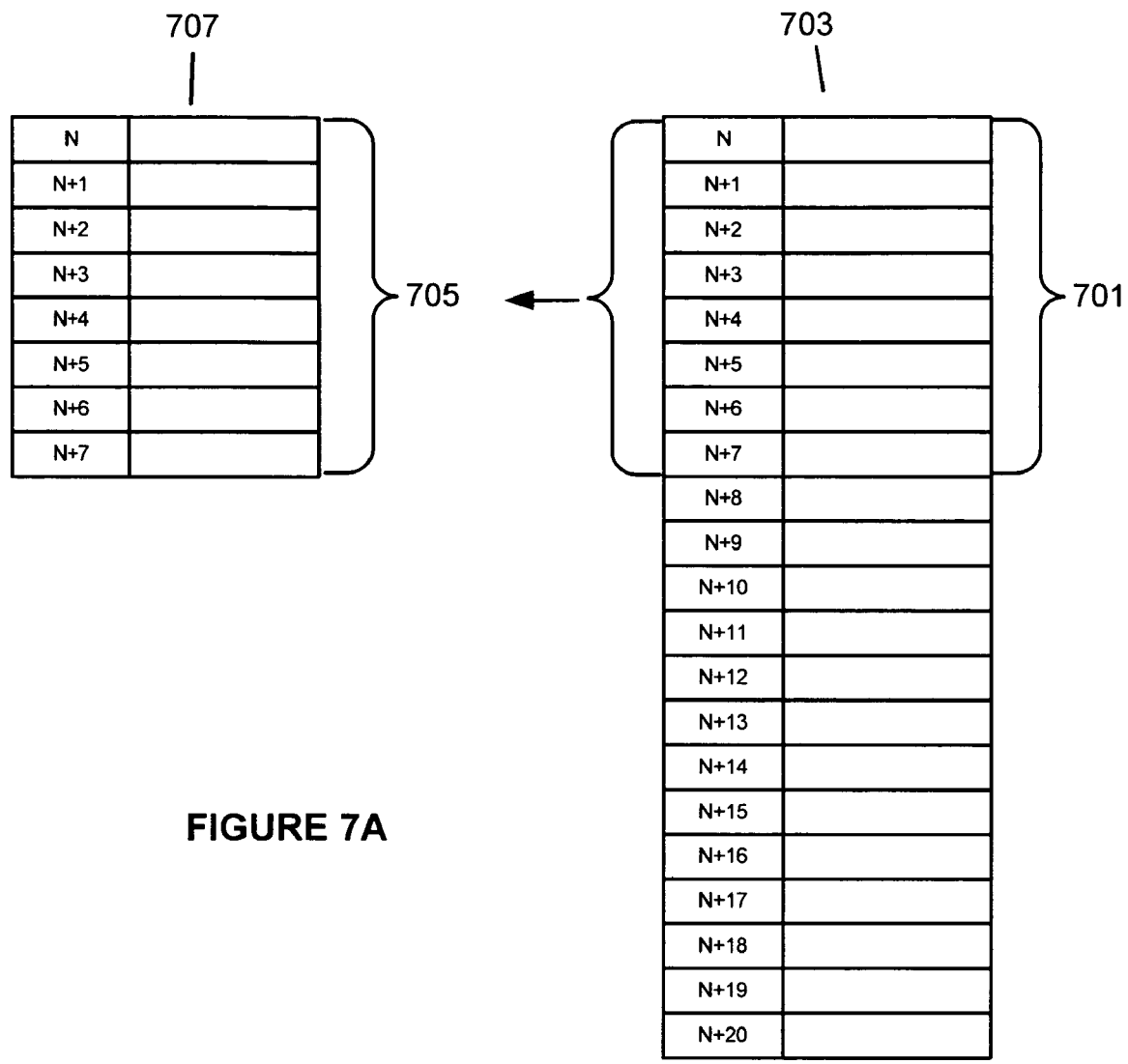
FIG. 7A is a diagrammatic representation of an address space to be mirrored and a corresponding cached copy at a first stage using a caching technique according to an alternative embodiment of the invention.
Figure 7B:
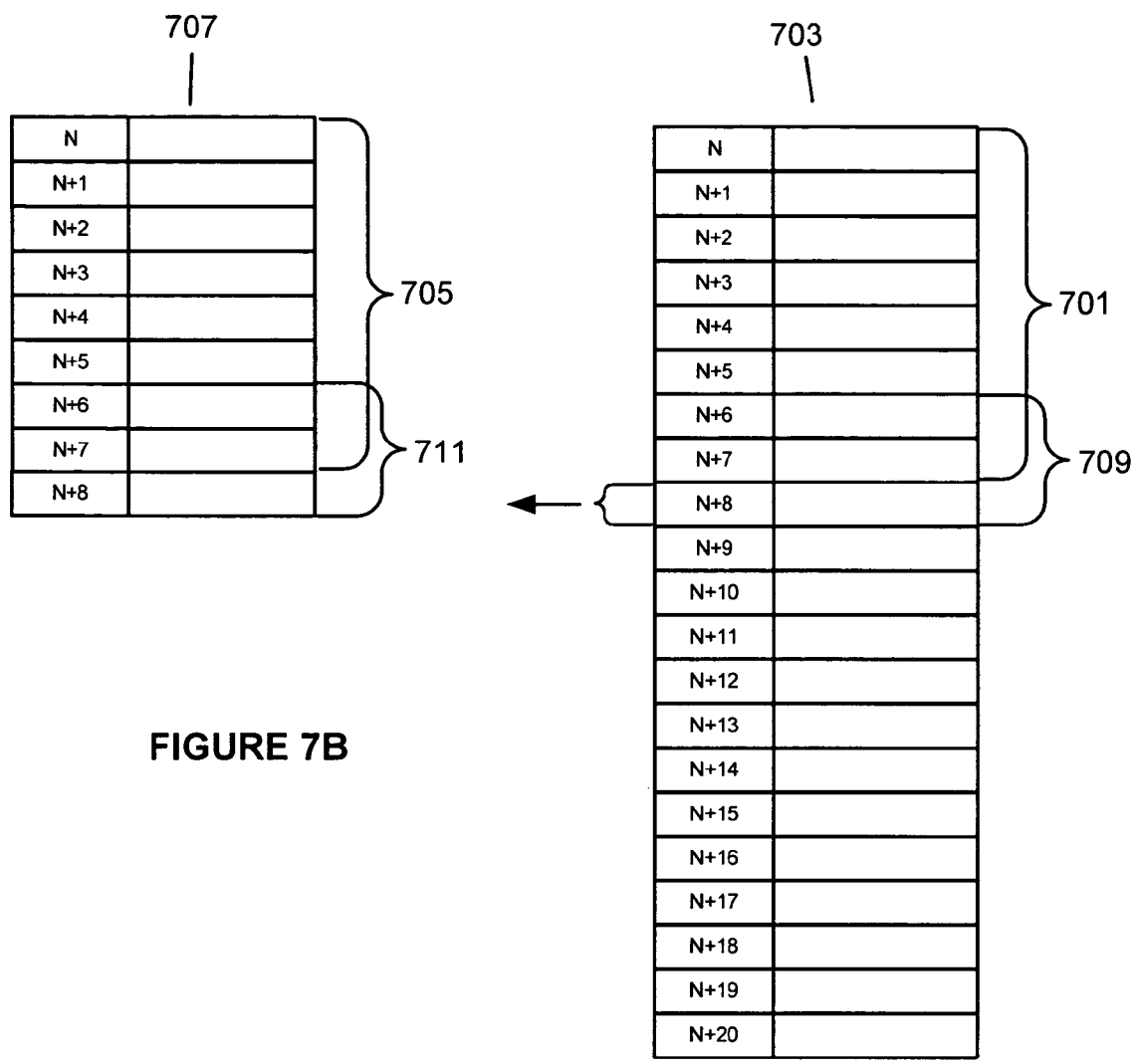
FIG. 7B is a diagrammatic representation of an address space to be mirrored and a corresponding cached copy at a second stage using a caching technique according to an alternative embodiment of the invention.
Figure 7C:
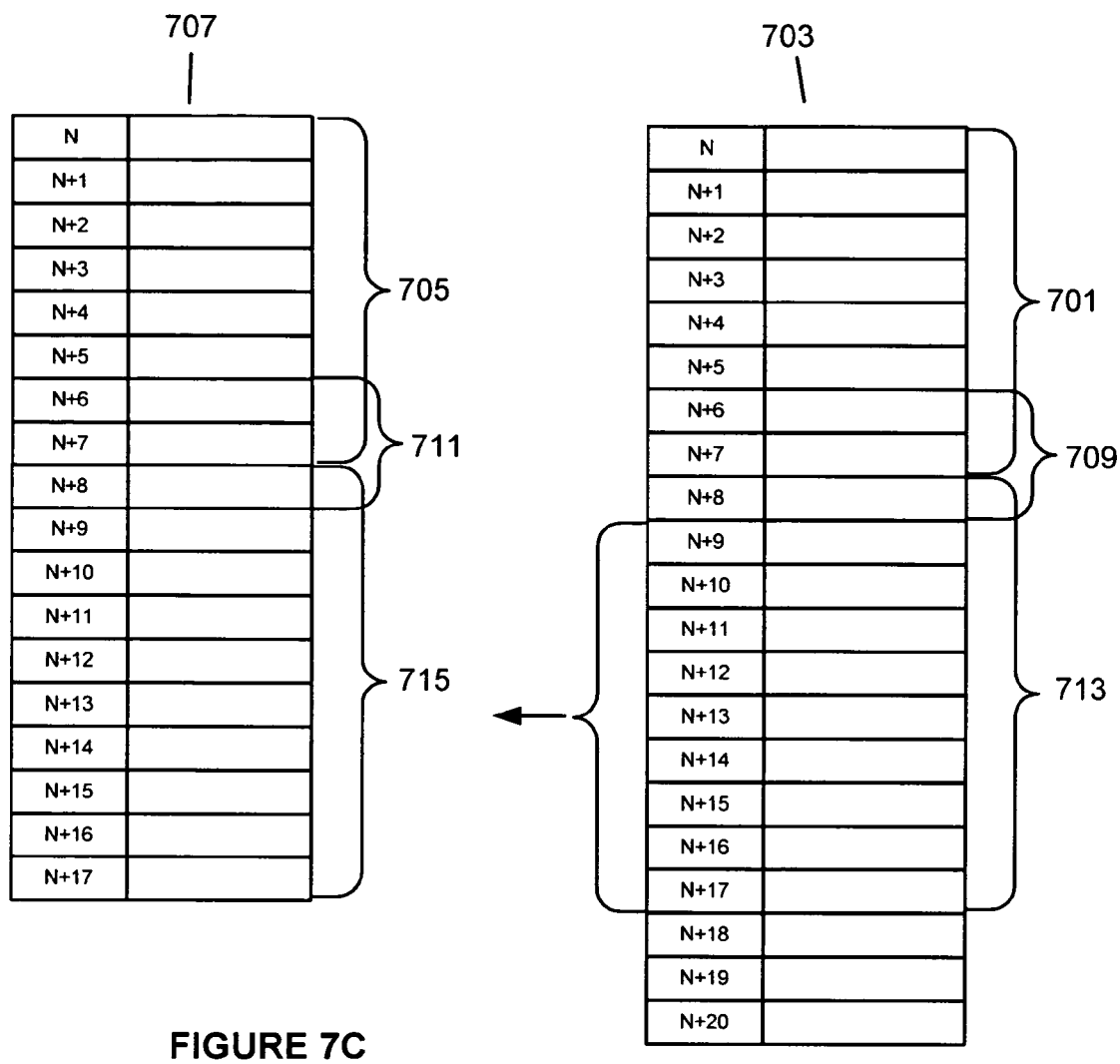
FIG. 7C is a diagrammatic representation of an address space to be mirrored and a corresponding cached copy at a third stage using a caching technique according to an alternative embodiment of the invention.
Figure 7D:
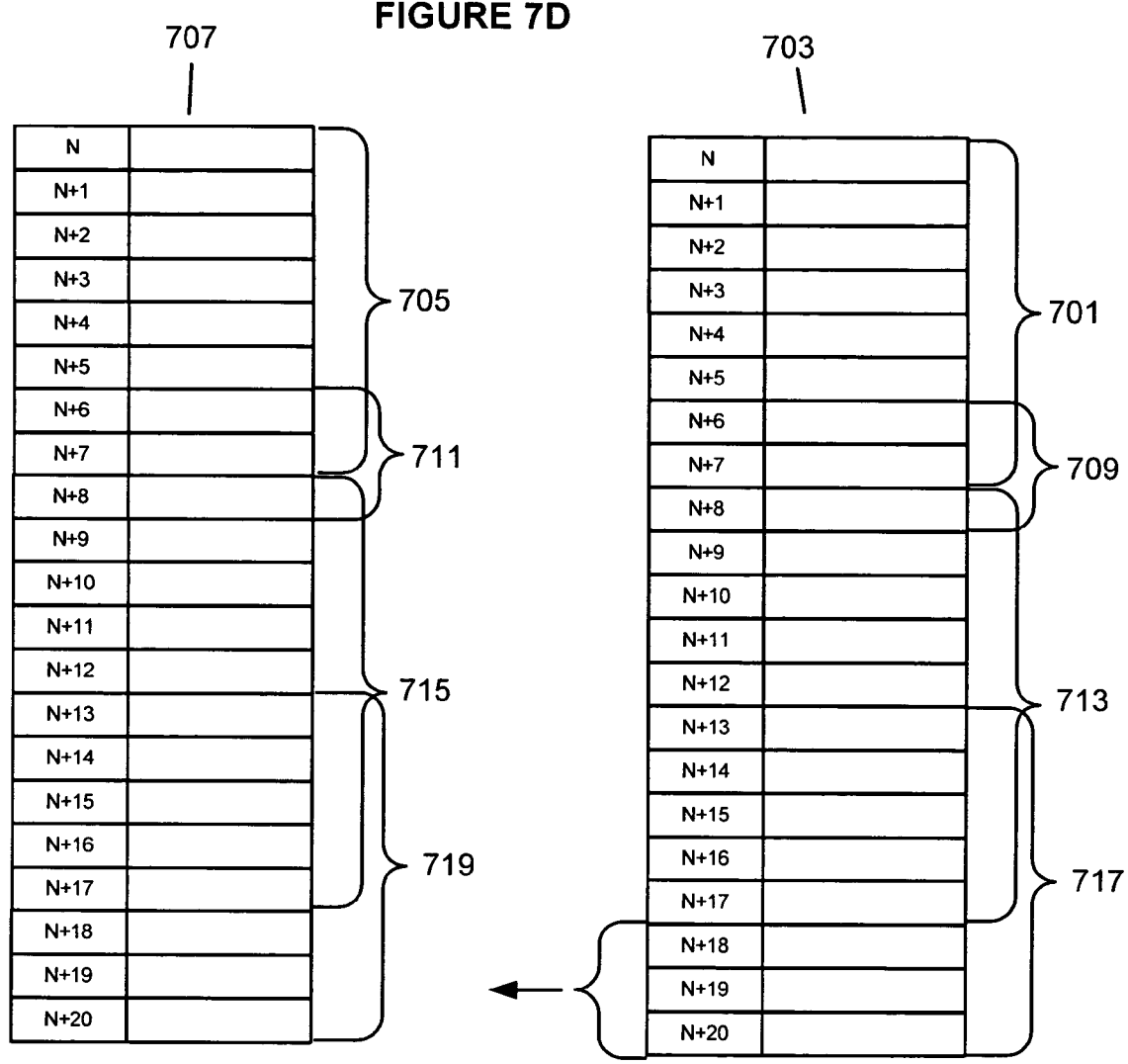
FIG. 7D is a diagrammatic representation of an address space to be mirrored and a corresponding cached copy at a fourth stage using a caching technique according to an alternative embodiment of the invention.

In FIG. 7A, it is shown that address range N through N+7 (701) is retrieved from the memory space 703 of the process for the code under test and is cached as entry 705 in the memory space 707 for the mirror code process. In FIG. 7B, it is shown that address range N+6 through N+8 (709) of the memory space 703 of the process for the code under test is duplicated in the memory space 707 for the mirror code process as entry 711, however only block N+8 was copied to reach this result. In FIG. 7C, it is shown that address range N+8 through N+17 (713) of the memory space 703 of the process for the code under test is duplicated in the memory space 707 for the mirror code process as entry 715, however only blocks N+9 through N+17 were copied to reach this result. Finally, in FIG. 7D, it is shown that address range N+13 through N+20 (717) of the memory space 703 of the process for the code under test is duplicated in the memory space 707 for the mirror code process as entry 719, however only blocks N+18 through N+20 were copied to reach this result.

While this technique saves retrieval time and storage space, it also requires slightly more complex management. In particular, dual address range trees are preferably maintained for efficient access, with one tree being indexed by debugger address (i.e. real address in the memory used by the process of the mirror code), and the other by debuggee address (i.e. real address in memory used by the process of the code under test). Coalescing of entries may be difficult due to fixed pointers in the debugger space, so care should accordingly be taken to balance the trees.

Figure 5:
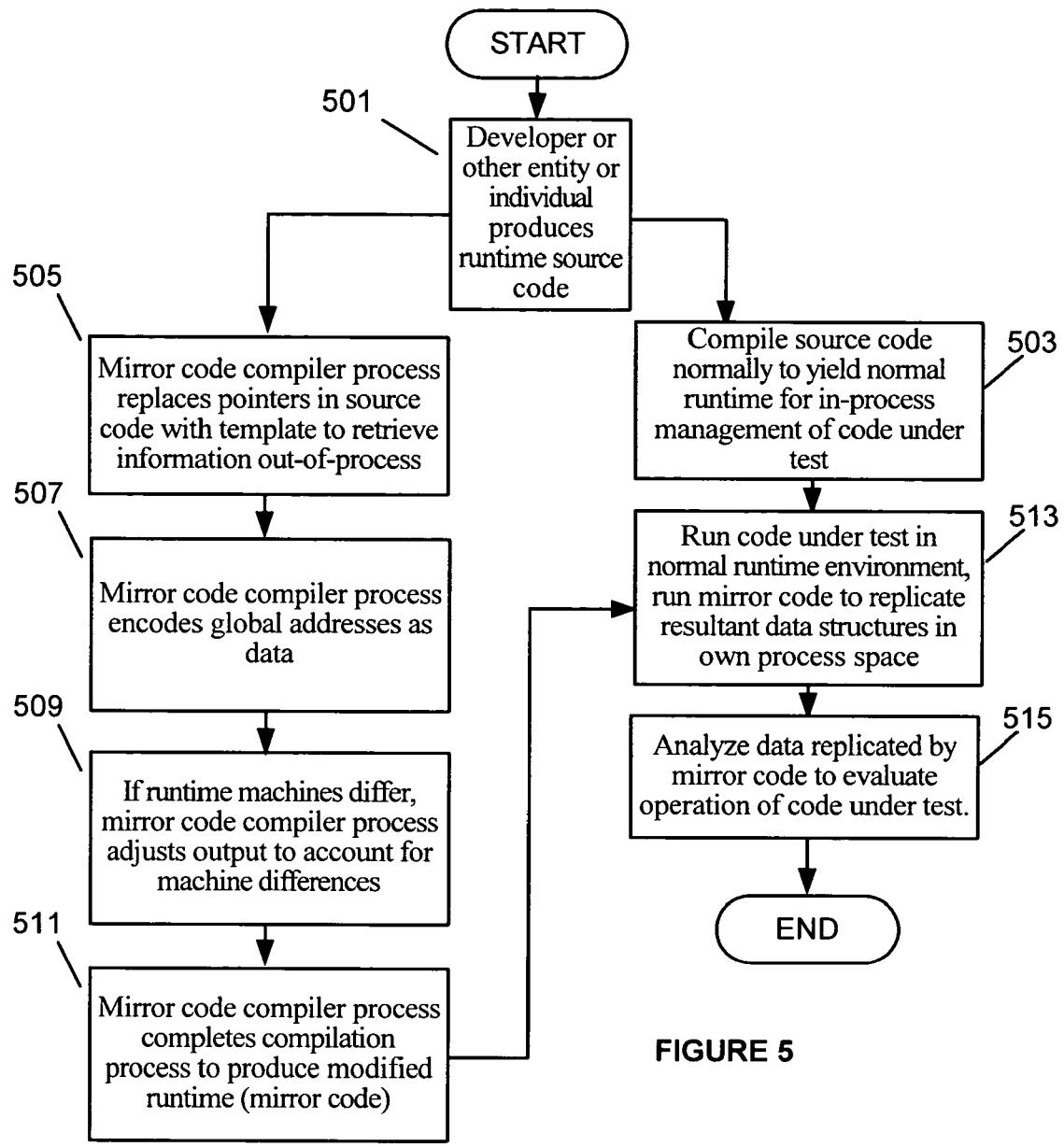
FIG. 5 is flow chart illustrating an example process for debugging code under test using an out-of-process mirror code process in an embodiment of the invention.

The flow chart of FIG. 5 illustrates the steps taken according to the principles described above to compile and use the mirror code to debug the code under test. At step 501, a developer or other entity or individual produces source code for a runtime environment to run managed code. The source code may be written in any suitable language, and is typically not directly executable at this point. At step 503, the source code is compiled normally to yield executable code for a runtime environment that uses in-process references in a standard manner. An example of such a runtime environment is the CLR (Common Language Runtime) environment produced by Microsoft Corporation of Redmond, Wash. In parallel with step 503, the source code is also compiled via a different compilation mechanism, i.e. the mirror code compiler process, in steps 505 through 511.

In particular, at step 505, the compiler processes the mirror code and replaces pointers in the runtime source code with a template that will retrieve the required information out-of-process, i.e. from the address space used by the code under test, at runtime. At step 507, the compiler processing the mirror code scans a listing of global addresses in the source code and uses symbolic information to determine each global address, then encodes each such address as data during compilation. If the machine on which the mirror code will run differs from the machine on which the code under test will run, then at step 509 the compiler process adds or alters padding for pointers and otherwise accounts for machine differences. At step 511, the compiler completes the compilation process for the mirror code to produce the executable modified runtime code. As discussed above, the runtime environment for the mirror code preferably differs in a number of respects from the runtime environment for the code under test to enable and optimize cross-process access.

At step 513, after the parallel compilation of the mirror code and the normal runtime code, the code under test is run in a runtime environment according to the normal runtime code. On the same or a different machines and the same or a different type of machine, the modified runtime code is run, and makes the cross-process references to the process of the code under test to replicate some or all data structures in its own process space. Note that the running of the mirror code and the running of the code under test within the normal runtime need not be contemporaneous.

At step 515, the data replicated by the mirror code is analyzed to evaluate the operation of the code under test. The analysis referred to in step 515 may occur when one or both of the mirror code and the code under test are running or may occur when neither is running. As noted, the data replicated by the mirror code may be all or only a portion of the data structures used by the code under test.

It will be appreciated that an improved system and method for cross-process memory access and mirroring have been described. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. In addition, although some illustrations herein relate primarily to techniques for debugging managed code, it will be appreciated that the invention applies equally to other uses such as debugging a dump file, profiling, inter-process communication, and so on. Therefore, the invention as described herein contemplates all such embodiments as may come within the scope of the following claims and equivalents thereof.

We claim:

1. A method for using a mirror code process to analyze a managed code process, the method comprising:
   performing dual compilation of source code into managed code and mirror code;
   running a managed code process in a runtime environment with the managed code, whereby the running managed code process writes to and reads from a first address space while running; and
   running a mirror code process with the mirror code, whereby the running mirror code process writes to a second address space while running, the second address space not overlapping the first address space;
   using cross-process memory access by the mirror code process, running within the mirror code process, to read from at least a portion of the first address space and write at least a portion of the contents of the first address space into the corresponding location in the second address space; and
   using debugger access into the second address space to analyze the runtime execution of the managed code process.

2. The method according to claim 1, further comprising the step of analyzing the portion of the contents of the first address space written into the second address space by the mirror code process, to identify flaws with respect to the managed code process.

3. A computer-readable medium having thereon computer-executable instructions for performing the method of claim 2.

4. The method according to claim 1, wherein using cross-process memory access by the mirror code process to write at least a portion of the contents of the first address space into the second address space comprises caching by the minor code process at least a portion of the contents of the first address space.

5. The method according to claim 4, wherein caching by the mirror code process at least a portion of the contents of the first address space comprises constructing a cache that omits duplicate addresses from first address space overlapping address ranges.

6. The method according to claim 4, wherein caching by the mirror code process at least a portion of the contents of the first address space comprises constructing a cache that includes duplicate addresses from first address space overlapping address ranges.

7. The method according to claim 1, wherein the runtime environment and the mirror code process run on different first and second respective computing devices, and wherein using cross-process memory access by the mirror code process comprises retrieving information at the second computing device from the first computing device.

8. The method according to claim 7, wherein the first and second computing devices have CPUs of mutually distinct types.

9. A computer-readable medium having thereon computer-executable instructions for performing the method of claim 8.

10. A computer-readable medium having thereon computer-executable instructions for performing the method of claim 1.

11. A method as recited in claim 1, further comprising:
    analyzing the source code to identify in-process pointers; and
    replacing in the mirror code at least a portion of the identified in-process pointers with cross-process pointers such that when the mirror code is run in a first process the cross-process pointers are usable to read information from a memory of a second process.

12. A computer-readable medium having thereon computer-executable instructions for performing the method of claim 11.

13. The method according to claim 11, wherein replacing at least a portion of the identified in-process pointers with cross-process pointers further comprises placing in the mirror code a retrieval routine associated with each such cross-process pointer, wherein the retrieval routine is operable to use the respective cross-process pointer to read from the memory of the second process.

14. A computer-readable medium having thereon computer-executable instructions for performing the method of claim 13.

15. The method according to claim 11, wherein replacing in the mirror code at least a portion of the identified in-process pointers with cross-process pointers further comprises:

scanning a listing of global data addresses in the source code;

determining each global address in the memory of the second process; and encoding each such global address in the mirror code as data.

16. The method according to claim 11, wherein replacing in the mirror code at least a portion of the identified in-process pointers with cross-process pointers further comprises utilizing a vtable pointer to identify the size of a class to be mirrored by the mirror code.

17. The method according to claim 11, further comprising additionally compiling the source code body of code into runtime code body, wherein in-process pointers in the source code remain as in-process pointers in the runtime code body.

18. The method according to claim 17, further comprising:

running the mirror code in the first process, whereby the first process writes to and reads from a first memory space while running;

running the runtime code body in the second process via a runtime environment, whereby the second process writes to and reads from the memory of the second process while running; and using cross-process memory access by the first process to write at least a portion of the contents of the memory of the second process into the first memory space.

19. A method as recited in claim 1, wherein the managed code process is run on a remote computing system that utilizes a different native language than a primary computing system used to run the managed code process.

20. A method as recited in claim 1, wherein running the mirror code process causes data structures generated during running of the managed code process to be replicated.

21. A method as recited in claim 20, wherein only some of the data structures generated during running of the managed code process are replicated during running of the mirror code process.

22. A system for compiling source code into mirror code of intermediate language code comprising:

means for performing dual compilation of source code into managed code and mirror code;

means for running a managed code process in a runtime environment with the managed code, whereby the running managed code process writes to and reads from a first address space while running; and means for running a mirror code process with the mirror code, whereby the running mirror code process writes to a second address space while running, the second address space not overlapping the first address space;

means for using cross-process memory access by the mirror code process, running within the mirror code process, to read from at least a portion of the first address space and write at least a portion of the contents of the first address space into the corresponding location in the second address space;

means for using debugger access into the second address space to analyze the runtime execution of the managed code process means for analyzing the source code to identify in-process pointers; and means for replacing in the mirror code at least a portion of the identified in-process pointers with cross-process pointers such that when the mirror code is run in a first process the cross-process pointers are usable to read information from a memory of a second process.

23. A method as recited in claim 19, wherein the method further includes padding pointers to account for differences in pointer size requirements of different platforms used by the primary and remote computing systems.

* * * * *